United States Patent
Watanabe et al.

(10) Patent No.: US 6,748,641 B2
(45) Date of Patent: Jun. 15, 2004

(54) METHOD OF PRODUCING A CAR BODY HAVING AN OUTER SURFACE FORMED FROM A PRE-FORMED PATTERNED PLASTIC FILM

(75) Inventors: Tadashi Watanabe, Hiratsuka (JP); Hideki Masuda, Hiratsuka (JP); Keiji Inomata, Hiratsuka (JP); Haruo Inoue, Hiratsuka (JP)

(73) Assignee: Kansai Paint Co., Ltd., Hyogo-ken (JP)

( * ) Notice: Subject to any disclaimer, the term of this patent is extended or adjusted under 35 U.S.C. 154(b) by 0 days.

(21) Appl. No.: 10/134,512

(22) Filed: Apr. 30, 2002

(65) Prior Publication Data

US 2002/0157777 A1 Oct. 31, 2002

Related U.S. Application Data

(62) Division of application No. 09/588,535, filed on Jun. 7, 2000, now abandoned.

(30) Foreign Application Priority Data

Jun. 7, 1999 (JP) .......................................... 11-159695

(51) Int. Cl.⁷ ............................................... B23P 25/00
(52) U.S. Cl. .......................... 29/458; 29/469.5; 29/460; 29/527.4
(58) Field of Search ....................... 29/458, 460, 527.2, 29/527.4, 469.5; 156/277; 427/286, 287; 428/31

(56) References Cited

U.S. PATENT DOCUMENTS

| | | | | |
|---|---|---|---|---|
| 4,520,053 A | * | 5/1985 | Marentic | 428/31 |
| 4,640,727 A | * | 2/1987 | Janssen | 428/204 |
| 4,900,611 A | * | 2/1990 | Carroll, Jr. | 428/216 |
| 4,943,680 A | * | 7/1990 | Ellison et al. | 427/154 |
| 5,035,940 A | * | 7/1991 | Winton et al. | 428/174 |
| 5,114,789 A | * | 5/1992 | Reafler | 428/31 |
| 5,192,609 A | * | 3/1993 | Carroll, Jr. | 428/328 |
| 5,242,751 A | * | 9/1993 | Hartman | 428/324 |
| 5,262,242 A | * | 11/1993 | Tomiyama et al. | 428/423.1 |
| 5,514,427 A | * | 5/1996 | Ellison et al. | 428/31 |
| 5,518,786 A | * | 5/1996 | Johnson et al. | 428/40.6 |
| 5,536,539 A | * | 7/1996 | Ellison et al. | 428/31 |
| 5,643,635 A | * | 7/1997 | Ahn et al. | 427/287 |
| RE35,739 E | * | 2/1998 | Ellison et al. | 428/31 |
| 5,853,890 A | | 12/1998 | Odawa et al. | |
| 5,912,052 A | | 6/1999 | Kuwano et al. | |
| 5,916,643 A | * | 6/1999 | Spain et al. | 428/31 |
| 6,113,838 A | * | 9/2000 | Flynn et al. | 264/510 |
| 6,126,730 A | | 10/2000 | Yoshida et al. | |
| 6,395,162 B1 | * | 5/2002 | Watanabe et al. | 205/50 |
| 6,547,912 B2 | * | 4/2003 | Enlow et al. | 156/244.23 |
| 6,551,432 B1 | * | 4/2003 | Spain et al. | 156/230 |
| 2002/0045047 A1 | * | 4/2002 | Hiraki et al. | 428/412 |

* cited by examiner

*Primary Examiner*—David P. Bryant
(74) *Attorney, Agent, or Firm*—Wenderoth, Lind & Ponack, L.L.P.

(57) ABSTRACT

There is disclosed a car body having a shell body, having a pattern excellent in beautification at the outer surface portion, made by forming a shell body by cutting, shaping and combining a metal plate, covered with patterned plastic film, which is used at the main outer surface of the car body, or by forming a shell body by fitting up the car parts, made by cutting, shaping and combining a metal plate, covered with patterned plastic film, to a previously assembled main body.

16 Claims, No Drawings

METHOD OF PRODUCING A CAR BODY HAVING AN OUTER SURFACE FORMED FROM A PRE-FORMED PATTERNED PLASTIC FILM

This application is a divisional application of Ser. No. 09/588,535 filed Jun. 7, 2000, now abandoned.

BACKGROUND OF THE INVENTION

1. Field of the Invention

The present invention relates to a car body having a shell body or car parts formed by using patterned metal plates covered by a patterned plastic film at the main outer surface portion of the car body.

2. Description of the Prior Art

In a car body of a normal or small passenger car, the body constituted mainly with sheet metal without riggings such as engine or chassis is called shell body. Usually the shell body consists of a "main body", consisting of underbody, side member, roof, cowl, upper back, lower back etc., and "outer cover parts" such as hood, front balance, fender, cowl louver, door, luggage (back door) etc.

Up to the present, these main body and outer cover parts are formed in such a way that a metal plate, which has been suitably degreased or surface treated, is cut and shaped in the size and shape of each part and the parts are assembled and combined, and a shell body, which is assembled with them, is dipped into a cationic electrodeposition paint bath, through which the current is passed, to form an undercoat coating film by coating on the surface, backside, edge surface etc. of the metal plate. Among them, mainly the portions corresponding to the outer surface are coated suitably with intermediate paint, topcoat paint etc.

Recently, however, in the field of car body coating, economical operation, energy saving and reduction of $CO_2$ gas generation in the coating line are strongly desired. Moreover, further improvement in throwing power of electrodeposition paint to edge surface portion, and chipping resistance, corrosion resistance etc. of the total multilayered coating film is demanded. Furthermore, in order to give a color design to the outer panel of a car body, 2-tone finish by painting with color paints with different color tones, sticking a colored adhesive tape etc. are practiced. However, it is difficult for these methods to respond to various individual and diversified demands due to their simplicity in pattern and lack of variation.

The present inventors have repeatedly conducted intensive studies to solve the problems in the coating of a car body as mentioned above. As a result, they found that the above-mentioned problems can be solved by forming a part or total of the shell body by using a metal plate covered with plastics, made by covering a desirably patterned plastic film on a metal plate and completed the present invention.

SUMMARY OF THE INVENTION

Thus, according to the present invention there is provided a car body characterized by using for the main outer surface portion of a car body a metal plate covered with a patterned plastic film, which is cut, shaped and combined to form a shell body.

According to the present invention there is provided also a car body characterized by using for the main outer surface portion of a car body car parts, made by cutting, shaping and combining a metal plate covered with a patterned plastic film, which are fit up to the main body, which has been previously assembled, to form a shell body.

Then, the car body of the present invention is described in more detail.

DESCRIPTION OF SPECIFIC EMBODIMENT

The present invention can be applied preferably to a car body of a car such as normal and small passenger car, but can be applied also to a car body of truck, bus, motorcycle, vehicle with special kind of equipment etc. in the same manner.

In such a car body the portion constituted mainly with sheet metal without riggings such as engine or chassis is called shell body which consists mainly of a main body and outer cover parts.

Main body means the fundamental part including the car room, combined, for example, by welding etc. and consists mainly of underbody, side member, roof, cowl, upper back, lower back etc. Underbody means the floor portion of the cabin, trunk room etc. and is named generically, including front underbody, front floor, rear floor etc. Side member forms the side of a cabin joining with a front body, roof panel, underbody etc. and prevents the car from bending and/or twisting. Cowl is a panel combining left, right, front and rear pillars. Upper back is a panel combining left and right quarter panels (rear fenders) at the back portion of a car body and forming outer surface of the car body. On the other hand, outer cover parts are "car parts" made by shaping sheet metal to be fitted up to the main body and consists specifically of hood, front balance, front fender, cowl louver, door, luggage (back door) etc.

The present invention is characterized by forming a shell body by using a metal plate covered with a patterned plastic film (hereinafter referred to as patterned covered metal film plate) in the main outer surface portion of a car body, or by forming a shell body by fitting up the car parts, which have been formed by using patterned covered metal plate mainly for outer cover parts, to the main body which has been assembled according to a conventional method.

Metal plate used for the preparation of patterned covered metal plate can be those which are usually used for a car body. As the material, there may be mentioned, for example, iron, steel, stainless steel, aluminium, copper, brass and alloys containing these metals, and further metal plates made by plating the surface of the plates consisting of these metals or alloys with zinc, zinc/nickel, iron etc. They can be used in coils or in cut plates. The thickness of these metal plates is suitably in the range of generally 0.3–2 mm, particularly 0.5–1 mm and it is preferable that the surface of these metal plates is treated suitably by grinding, alkali degreasing, electrolytic cleaning, chemical treatment with zinc phosphate, chromate etc. in order to improve the adhesivity with a plastic film, corrosion resistance etc.

As materials of plastic film to cover the above-mentioned metal plates, there can be mentioned known thermoplastic resins, for example, polyolefin resin such as polyethylene, polypropylene etc., polyester resin such as polyethylene terephthalate (PET) etc., polycarbonate resin, epoxy resin, vinyl acetate resin, vinyl chloride resin, fluorine-containing resin, polyvinyl acetal resin, polyvinyl alcohol resin, nylon, polyamide resin, polystyrene resin, acrylic resin, polyurethane resin, phenolic resin, polyether resin, cellulose type resin such as cellulose acetate etc. They may be colored in solid color tone, metallic tone or iridescent tone.

Plastic film can be prepeared by molding the above-mentioned resin material into film shape by, for example, extrusion molding, injection molding, calender molding, compression molding etc. and its thickness is preferably in the range of usually 1–100 μm, particularly 3–75 μm, more particularly 5–50 μm. Said plastic film is preferably non-electroconductive. Moreover, it is possible to treat the surface of said plastic film by corona discharge, plasma, flame etc. before or after the covering onto the metal plate. In the present invention a colorless-transparent, colored-transparent, or colored-non-transparent plastic film can be used according to the application purpose.

The present invention it is characterized by covering the metal surface by using the above-mentioned plastic film which has been previously patterned. Here "pattern" is not particularly restricted, as long as it expresses designability, good outlook, originality, discrimination etc. at the outer portion of the shell body of a car body. Its tone may be colored and/or colorless and as its form there can be mentioned letters, modified letters, marks, symbols, illustrations, pictures, picture patterns and their combinations etc. These can be constituted in single color, mixed color, compound color, gradation, shades of color etc.

These patterns can be formed on either one side, surface or back, or both sides of the plastic film.

In the present invention it is characterized by covering the metal surface by using the above-mentioned plastic film which has been previously patterned. Here "pattern" is not particularly restricted, as long as it expresses designability, good outlook, originality, discrimination etc. at the outer portion of the shell body of a car body. Its tone may be colored and/or colorless and as its form there can be mentioned letters, modified letters, marks, symbols, illustrations, pictures, picture patterns and their combinations etc. These can be constituted in single color, mixed color, compound color, gradation, shades of color etc.

These patterns can be formed either one side, surface or back, or both sides of the plastic film.

Patterning of plastic film can be conducted, for example, by printing using a printing ink or by coating with a color paint. As printing ink and paint per se known products can be used and they consist of generally coloring materials (pigments, dyestuffs), resin or fat and oil and solvent, and further, as necessary, plasticizers and additives (for example, wax, dryer, dispersant, wetting agent, emulsifier, skinning preventing agent, stabilizer etc.). As coloring material, there can be mentioned, for example, inorganic pigments such as titanium oxide, carbon black, aluminium powder, bronze powder etc.; organic pigments such as disazo yellow, brilliant carmine, lake red, phthalocyanine blue, methyl violet lake etc.; fluorescent pigments; dyestuffs (acid dyes, basic dyes, oil colors, disperse dyes) such as eosine, victoria blue, nigrosine, disperse red etc. As resin there can be mentioned, for example, rosin-modified phenolic resin, urea resin, melamine resin, ketone resin, vinyl chloride type resin, butyral resin, styrene-maleic acid resin, chlorinated polypropylene, acrylic resin, cumarone-indene resin, petroleum resin, polyester resin, alkyd resin, polyamide resin, epoxy resin, polyurethane resin, nitrocellulose, ethyl cellulose, hydroxyethyl cellulose, rubber type resin etc. As solvent organic solvents, water etc. can be used.

As printing ink and paint prepared from these components there can be mentioned, for example, evaporation drying type, reaction curing type, oxidation polymerization type, thermosetting type, 1-liquid curing type, multiliquid curing type, ultraviolet curing type, solid color coating film formation type, metallic coating film formation type, iridescent coating film formation type, colored non-transparent coating film formation type, colored transparent coating film formation type etc.

Printing with a printing ink onto a plastic film can be conducted by per se known methods. As printing plate there can be used letterpress plate, lithographic plate, copper plate, stencil plate etc. As printing method there can be used, for example, lithography, letterpress printing, copper plate printing, screen printing, flexography, gravure, offset printing, electronic photography, thermal transfer printing, ink jet printing, magnetography, electronic printer, direct printing, dye lithography, dips, delphi double-sided printing etc. according to the patterns to be given. Further, it is possible to print a pattern with a cubic effect or high-class feeling by halftone printing, photo printing, multiple printing etc. Furthermore, as method of forming pattern on a plastic film by using a paint there can be used, for example, in addition to the above-mentioned printing methods, brushing, spray coating, airless coating, electrostatic coating etc.

Printing with a printing ink and coating with a paint onto a plastic film can be conducted on either one side, surface or back, or both sides of said film. In case the backside (the side touching the metal plate) is printed or coated, it is preferable to use a colorless-transparent or colored-transparent plastic film, because the pattern will be seen through the plastic film.

Covering of plastic film onto the metal plate can be conducted by per se known methods, for example, adhering the plastic film onto the surface of a metal plate by pressing with a pressing roll. In the process the metal plate and/or plastic film are preferably heated to higher than 50° C., preferably 80–200° C. Covering of the plastic film is conducted at least to the surface of a metal plate portion located at the outer side of an outer plate portion of a car body. However, it is possible to cover both surfaces of the metal plate with plastic film.

In order to increase the adhesivity between the metal plate and plastic film it is preferable to previously coat an adhesive to the prescribed portions of the metal plate and/or plastic film. As such an adhesive there can be mentioned thermosetting resin compositions containing as main component one or more resins selected from, for example, acrylic resin type, rubber type, epoxy resin type (for example, bisphenol type epoxy resin, resol type epoxy resin), urethane resin type, polyester resin type, polyolefin type, polysiloxane resin etc. and compounded, as necessary, with crosslinking agent such as melamine resin, polyisocyanate compound etc. Further, there can be used as adhesive triazinethiol type compounds such as 2,4,6-trimercapto-S-triazine, 2-dibutylamino-4,6-dimercapto-S-triazine, 2,4,6-trimercapto-S-triazine-monosodium salt, 2,4,6-trimercapto-S-triazine-trisodium salt etc.

Adhesive can be coated on both or either of the metal plate and plastic film. Coating of an adhesive can be conducted, for example, by roll coater, curtain coater, flow coater, die coater, spray etc. and its coating film is preferably half cured by heating at a temperature of from about 60° C. to about 180° C. Its film thickness is preferably in the range of 0.1–20 μm, particularly 1–5 μm as cured coating film.

A car body, the objective of the present invention, is provided by forming a shell body by cutting, shaping and combining the patterned covered metal plate thus prepared, or by forming a shell body by fitting up the car parts, which have been formed by cutting, shaping and combining the patterned covered metal plate, to the previously assembled main body.

By using the patterned covered metal plate a main body consisting of underbody, side member, roof, cowl, upper back, lower back etc. and further outer cover parts (car parts) such as hood, front balance, front fender, cowl louver, door, luggage (back door) etc. are prepared. Here underbody means the floor portion of cabin, trunk room etc. and is named generically including front underbody, front floor, rear floor etc. Side member forms the side of a cabin joining with a front body, roof panel, underbody etc. and prevents the car from bending and/or twisting. Cowl is a panel combining left, right, front and rear pillars. Upper back is a panel combining left and right quarter panels (rear fenders) at the back portion of a car body and forming outer surface of the car body.

Specifically, the patterned covered metal plate is cut in the objective shape and size, and shaped by a press etc. Parts such as underbody, side member, roof, cowl, upper back, lower back etc. are formed by combining the pieces with adhesives, welding, bolting etc. to prepare a main body. These cutting, shaping, combining etc. can be conducted by known methods. At least the outer side of the main body thus formed is covered with a patterned plastic layer. Outer cover parts such as hood, front balance, front fender, cowl louver, door, luggage etc. can be prepared in the same manner by using a patterned covered metal plate. Cutting, shaping, combining etc. can be conducted by per se known methods.

The present invention includes a car body, in which the main outer surface of the shell body, consisting of main body and outer cover parts, is formed by using a patterned covered metal plate, and a car body made by fitting up the shell body, consisting of main body and outer cover parts, whose main outer surface is formed by using the patterned covered metal plate, to the main body prepared by a known method.

Among them, in the car body, in which the main outer surface of the outer cover parts of the shell body is formed by using a patterned covered metal plate, the main body, to which the outer cover parts are fitted up, is prepared without using a patterned covered metal plate but by cutting, shaping and processing, and combining a usual uncovered metal plate by a known method. A shell body is formed by fitting up the outer cover parts (car parts), prepared by using a patterned covered metal plate, to the main body prepared by using such uncovered metal plate.

In the shell body assembled by such a method, the cut edge surface portion of the patterned covered metal plate and the surface the metal plate, which is not coated with plastic film, have exposed metal surface and are prone to generate rust. In order to prevent it, it is more preferable to dip said shell body into an electrodeposition coating paint bath and to coat these exposed metal portions by electrodeposition coating.

As an electrodeposition paint either anionic type or cationic type can be used. Generally, however, it is preferable to use a cationic type capable of forming a coating film with excellent corrosion resistance etc.

Cationic electrodeposition paint is coated onto the exposed metal portions in a car body formed according to the present invention. Preferably the coating film is not deposited on the surface of the patterned plastic layer but functions as an undercoat coating film (for example, corrosion resistance, adhesivity, chipping resistance).

As a cationic electrodeposition paint having such functions there can be mentioned, for example, i) cationic electrodeposition paints containing as base resin epoxy resin, polyester resin, acrylic resin, polyurethane resin etc. having hydroxyl group and amino group; ii) cationic electrodeposition paints containing as base resin amino group-containing epoxy resin modified with a resin such as polyester resin, acrylic resin, polyurethane resin etc. having hydroxyl group and amino group; iii) cationic electrodeposition paints containing as base resin a mixture of a nonionic resin such as polyester resin, acrylic resin, modified polyolefin resin, polyurethane resin etc. and an amino group-containing epoxy resin. These base resins have preferably a number-average molecular weight in the range of 400–10000, particularly 1000–4000, an amine value in the range of 3–200 mgKOH/g, particularly 10–80 mgKOH/g, and a hydroxyl group equivalent in the range of 5–300 mgKOH/g, particularly 10–150 mgKOH/g.

These cationic electrodeposition paints can be either of an outside crosslinking type which uses a curing agent together, or of an inner (self)crosslinking type which contains a crosslinking functional group together in the base resin. As a crosslinking agent used in case of an outside crosslinking type there can be mentioned blocked polyisocyanate compounds, amino resins, tri(alkoxycarbonyl)triazine (commonly called as TACT) resin etc. Among them, aliphatic blocked polyisocyanate compounds are particularly suitable. As a crosslinking functional group in an inner crosslinking type blocked polyisocyanate group, α,β-unsaturated carbonyl group etc. are preferable.

A cationic electrodeposition paint can be prepared, after mixing a curing agent such as blocked polyisocyanate compound etc. to the base resin as necessary, by neutralizing a cationic group such as amino group etc. in the base resin with an acid compound such as acetic acid, formic acid, lactic acid, phosphoric acid, amidosulfonic acid etc. and then mixing in water. The pH of an electrodeposition bath is suitably in the range of generally 3–9, particularly 5–7 and the solid content concentration in the range of 5–30% by weight.

To a cationic electrodeposition paint there can be suitably compounded, as necessary, a curing catalyst having rust preventive properties such as hydroxide, oxide, organic acid salt, inorganic acid salt etc. of a metal selected from, for example, aluminium, nickel, zinc, strontium, lead, zirconium, molybdenum, tin, antimony, lanthanum, tungsten, bismuth etc.; rust preventive pigment, inhibitor, usually used color pigment, organic pigment, extender pigment, antisettling agent etc.

By dipping a shell body formed according to the present invention into a cationic electrodeposition paint bath as a cathode and conducting an electrodeposition coating for 1–10 minutes of passing a current, at 20–35° C. of bath temperature and 100–400 V of voltage, an electrodeposition coating film can be deposited to an exposed metal portion of an edge surface generated by cutting, a metal portion which is not covered with plastics, etc. The film thickness of the deposited electrodeposition coating film is preferably in the range of about 10- about 40 $\mu$m, particularly 10–20 $\mu$m based upon a cured film. The electrodeposition coated shell body is drawn up from the electrodeposition bath, washed suitably with water and heated to about 100- about 200° C. to cure the electrodeposition coating film and thus to obtain a car body, the objective of the present invention.

Moreover, the surface of the patterned plastic film of a car body of the present invention formed as mentioned above can be further coated with a clear paint forming a colored-transparent or colorless-transparent coating film. And the portions, on which an electrodeposition coating film is formed, can be coated with an intermediate paint and topcoat paint. As these clear paint, intermediate paint and topcoat paint, per se known paints can be used.

As a clear paint it is preferable to use a paint comprising a thermosetting resin composition made by compounding a crosslinking agent such as melamine resin, (blocked) polyisocyanate compound etc. with a base resin such as acrylic resin, polyester resin etc. having functional groups such as hydroxyl group etc. As an intermediate paint it is preferable to use a paint made by compounding color pigment, extender pigment etc. with a resin composition containing a crosslinking agent such as melamine resin, (blocked) polyisocyanate compound etc. and a base resin such as acrylic resin, polyester resin etc. having functional groups such as hydroxyl group etc. Further, as a topcoat paint it is preferable to use a color paint, forming a solid color or metallic coating film, made by compounding color pigment, iridescent pigment, metallic pigment etc. with a resin composition containing a crosslinking agent such as melamine resin, (blocked) polyisocyanate compound etc. and a base resin such as acrylic resin, polyester resin etc. having functional groups such as hydroxyl group etc. It is also possible to coat the aforementioned clear paint further on the coating film of the topcoat paint.

According to the present invention the following effects can be obtained.

1) As the outer cover parts or main body and outer cover parts of the car body is constituted with a patterned covered metal plate, it is possible to reduce the amount of the electrodeposition paint to be used in the next step.
2) As the outer cover parts or main body and outer cover parts of the car body is constituted with a patterned covered metal plate, which is covered with plastic film having a high volume specific resistance, the area of the portion to be coated by electrodeposition (exposed metal portion) is small and consequently the throwing power increases and particularly the corrosion resistance of the edge surface portion is improved.
3) It is possible to give the properties, which the covering plastic film has, for example, chipping resistance, corrosion resistance etc. to a car body.
4) As the pattern to be given to the plastic film can be conducted by printing, it becomes possible to very easily give a complicated, fine, delicate pattern, which could not be expressed by the conventional painting means, and the designability of a car body can be remarkably improved.

EXAMPLES

The present invention will be described more specifically by Examples and Comparative Examples. Parts and % are by weight and the film thickness of the coating film is that of the cured coating film.

1. Preparation of a patterned covered metal plate (a) One side of a white, non-transparent polyester film (film thickness 16 µm), both sides of which had been treated by corona discharge, was coated with a thermocurable polyester resin type adhesive to a film thickness of 7 µm and dried by heating at 120° C. for 30 seconds, and a flower pattern was printed by gravure on the surface of the other side with 5 colors: 4 colored inks and a white ink (film thickness 3 µm) and dried to obtain a patterned plastic film.

Both sides of a cold rolled steel plate (thickness 0.8 mm) was plated with alloyed molten zinc so that the plated amount be 45 g/m$^2$, degreased and chemically treated with zinc phosphate ("PB #3080 Treatment"; a product of Nihon Parkerizing Co., Ltd.). On one side of this metal plate the above-mentioned patterned polyester film was adhered with heat and pressure through the intermediary of the adhesive to prepare a patterned covered metal plate (a).

(b) A patterned covered metal plate (b) plate was prepared in the same manner as the above-mentioned (a) with the exception that the metal plate in the above-mentioned (a) was replaced by a cold rolled steel plate of 0.8 mm thickness which had been degreased and chemically treated with zinc phosphate ("PB #3080 Treatment"; a product of Nihon Parkerizing Co., Ltd.).

(c) A spotted pattern was printed by gravure on one side of a blue, transparent polyester film (film thickness 16 µm), both sides of which had been treated by corona discharge, with 5 colors: 4 colored inks and a white ink (film thickness 3 µm). After drying, the printed surface was coated with a thermocurable polyester resin type adhesive to a film thickness of 7 µm and dried by heating at 120° C. for 30 seconds to obtain a patterned plastic film.

Both sides of a cold rolled steel plate (thickness 0.8 mm) was plated with alloyed molten zinc so that the plated amount be 45 g/m$^2$, degreased and then coated with 5% butyl cellosolve-diluted triazinethiol ("ZISNET F"; a product of Sankyo Kasei Corporation). On one side of this metal plate the patterned polyester film was adhered with heat and pressure through the intermediary of the thermocurable polyester resin type adhesive to prepare a patterned covered metal plate (c).

2. Examples and Comparative Examples

Example 1

A model of a main body (size is about ⅕ of the actual thing), consisting of underbody, side member, roof, cowl, upper back and lower back, was previously prepared by cutting, shaping and combining the uncoated metal plate which had been plated with alloyed molten zinc. Further, models of outer cover parts (car parts) (size is about ⅕ of the actual thing) such as hood, fender, door, luggage door etc. were prepared by cutting, shaping and combining the patterned covered metal plate (a).

A shell body was formed by fitting up these outer cover parts to the above-mentioned main body and dipped into a cationic electrodeposition paint ("Elecron #9600 Gray", a product of Kansai Paint Co., Ltd; epoxy resin type) bath to coat the exposed metal portion of the shell body by electrodeposition under the conditions of electrodeposition bath temperature 28° C., voltage 250 V, and totally dipped current passing time 2 minutes. After washing with water the electrodeposition coating film was cured by heating at 170° C. for 30 minutes.

Example 2

The same operation as Example 1, except using the patterned covered metal plate (b) instead of the patterned covered metal plate (a) in the above-mentioned Example 1, was conducted.

Example 3

The same operation as Example 1, except using the patterned covered metal plate (c) instead of the patterned covered metal plate (a) in the above-mentioned Example 1, was conducted.

Comparative Example 1

The same operation as Example 1, except using an uncoated metal plate, which had been plated with alloyed molten zinc so that the plated amount be 45 g/m$^2$, degreased and chemically treated with zinc phosphate ("PB #3080 Treatment"), instead of the patterned covered metal plate (a) in the above-mentioned Example 1, was conducted.

Comparative Example 2

The same operation as Example 1, except using a cold rolled steel plate of 0.8 mm thickness, which had been degreased and chemically treated with zinc phosphate ("PB #3080 Treatment"), instead of the patterned covered metal plate (a) in the above-mentioned Example 1, was conducted.

3. Performance test results

Various performance tests were conducted on the car shell bodies (model) after the electrodeposition coating obtained by Examples and Comparative Examples. The results are shown later in Table 1.

Test methods are as follows.

Chipping resistance: Chipping resistance test was conducted on a coated plate obtained by coating a flat plastics-covered metal plate of the size 7 cm×15 cm used for outer cover parts of the shell body model in Examples and Comparative Examples (in Comparative Examples, however, an electrodeposition-coated metal plate was used) with an intermediate paint ("Lugabake KPX-60", a product of Kansai Paint Co., Ltd.; polyester resin/amino resin type) to a film thickness of 25 μm, curing by heating at 140° C. for 30 minutes, then coating further with a white top coat paint ("Amilac White", a product of Kansai Paint Co., Ltd.; polyester resin/amino resin type) to a film thickness of 35 μm, and curing by heating at 140° C. for 30 minutes. Using "Q-G-R Gravelometer" (a product of Q Panel) as a testing machine, about 50 g of No. 7 crushed stones were blown onto the coating surface at an angle of 90° at −20° C. by an air pressure of about 4 kg/cm². After that an adhesive cellophane tape was stuck on the coating surface, and the state of chipping of the coating film from the portion, on which the shock had been given, was visually observed, after rapidly peeling-off the adhesive tape.

○ shows that a little chipping of the topcoat coating film and intermediate coating film by shock was observed but there is no exposure of metal surface at all, Δ shows that much chipping of the topcoat coating film and intermediate coating film by shock was observed and there is a little exposure of metal surface, too, and X shows that much chipping of the topcoat coating film and intermediate coating film by shock is observed and there is much exposure of metal surface, too.

General portion corrosion resistance: After placing the models obtained in Examples and Comparative Examples in a salt water resistance spray test machine (35° C.) for 960 hours, the corrosion resistance at the outer surface portion of outer cover of the shell body, namely the portion covered with polyester film (Examples) and the portion coated by electrodeposition (Comparative Examples) was visually observed.

○ shows that no generation of rust or blistering is observed at all, Δ shows that a little generation of rust or blistering is observed, and X shows that much generation of rust or blistering is observed.

Edge corrosion resistance: After placing the models obtained in Examples and Comparative Examples in a salt water resistance spray test machine for 240 hours, the corrosion resistance at the edge surface portion of the cut portion of the shell body (acute angle portion) was observed.

○ shows that no generation of rust at the edge surface portion is observed at all, Δ shows that a little generation of rust at the edge surface portion is observed, and X shows that much generation of rust at the edge surface portion is observed.

TABLE 1

|  | Examples | | | Comparative Examples | |
|---|---|---|---|---|---|
|  | 1 | 2 | 3 | 1 | 2 |
| Chipping resistance | ○ | ○ | ○ | × | Δ |
| General portion corrosion resistance | ○ | ○ | ○ | Δ | Δ |
| Edge corrosion resistance | ○ | ○ | ○ | Δ | Δ |

What is claimed is:

1. A process for producing a car body which comprises printing at least one face of a pre-formed plastic film with a pattern selected from the group consisting of letters, modified letters, marks, symbols, illustrations, pictures, picture patterns and a combination thereof; covering a metal plate with the thus obtained pre-formed, patterned plastic film; cutting the thus obtained covered metal plate to size and shape; shaping the cut covered metal plate; and combining the shaped covered metal plate with some other part(s) to form a shell body, the covered metal plate being used at a main outer surface portion of the car body.

2. A process set forth in claim 1, wherein the main outer surface portion comprises roof, hood, fender, door and luggage compartment lid of the car body.

3. A process for producing a car body which comprises printing at least one face of a pre-formed plastic film with a pattern selected from the group consisting of letters, modified letters, marks, symbols, illustrations, pictures, picture patterns and a combination thereof; covering a metal plate with the thus obtained pre-formed, patterned plastic film; cutting the thus obtained covered metal plate to size and shape; shaping the cut covered metal plate; combining the shaped covered metal plate with some other part(s) to make car parts; and fitting up the car parts to a previously assembled main body to form a shell body, the covered metal plate being used at a main outer surface portion of the car body.

4. A process set forth in claim 3, wherein the main outer surface portion comprises outer surface portion of outer cover parts of the car body.

5. A process set forth in claim 1 or 3, wherein the plastic film has a thickness in the range of 1–100 μm.

6. A process set forth in claim 1 or 3, wherein the plastic film is patterned on one side.

7. A process set forth in claim 1 or 3, wherein the pattern is given on the plastic film by printing with printing ink or by coating with color paint.

8. A process set forth in claim 1 or 3, wherein the covering of metal plate with the plastic film is conducted by adhesion of the plastic film onto the surface of the metal plate by pressing with a pressing roll.

9. A process set forth in claim 1 or 3, wherein the plastic film is adhered onto the metal plate through the intermediary of an adhesive.

10. A process set forth in claim 1 or 3, which further comprises coating the surface of the patterned plastics in the car body with a clear paint.

11. A process set forth in claim 1 or 3, wherein the plastic film has a thickness in the range of 3–75 μm.

12. A process set forth in claim 1 or 3, wherein the plastic film is patterned on both sides.

13. A process set forth in claim 1 or 3, which further comprises conducting an electrodeposition coating to the exposed metal portion in the car body.

14. A process set forth in claim 13, wherein the paint to be coated by electrodeposition coating is a cationic electrodeposition paint.

15. A car process forth in claim 13, wherein the thickness of the coating film by electrodeposition coating is in the range of about 10–40 µm.

16. A process set forth in claim 13, wherein the thickness of the coating film by electrodeposition coating is in the range of 10–20 µm.

* * * * *